(12) United States Patent
Milioti

(10) Patent No.: US 11,065,856 B2
(45) Date of Patent: Jul. 20, 2021

(54) INDUSTRIAL MACHINE FOR APPLYING TEMPORARY OR PERMANENT PROTECTIVE FILMS TO PLANAR SURFACES ACTING SIMULTANEOUSLY ON TWO FACES, HAVING A SYSTEM FOR CUTTING THE FILM AND POSITIONING EDGE-TO-EDGE OR WITH A MARGIN, AUTOMATICALLY ADAPTING TO SUIT CHANGES IN THE PARTS THAT ARE TO BE TREATED, USING AN ELECTROSTATIC METHOD

(71) Applicant: ASIDIUM, Genas (FR)

(72) Inventor: Stéphane Milioti, Genas (FR)

(73) Assignee: ASIDIUM, Genas (FR)

( * ) Notice: Subject to any disclaimer, the term of this patent is extended or adjusted under 35 U.S.C. 154(b) by 71 days.

(21) Appl. No.: 16/484,152

(22) PCT Filed: Feb. 10, 2017

(86) PCT No.: PCT/EP2017/000208
§ 371 (c)(1),
(2) Date: Aug. 7, 2019

(87) PCT Pub. No.: WO2018/145721
PCT Pub. Date: Aug. 16, 2018

(65) Prior Publication Data
US 2020/0001586 A1  Jan. 2, 2020

(51) Int. Cl.
*B32B 37/02* (2006.01)
*B32B 17/06* (2006.01)
(Continued)

(52) U.S. Cl.
CPC ............ *B32B 37/02* (2013.01); *B32B 17/064* (2013.01); *B32B 37/10* (2013.01); *B32B 37/223* (2013.01);
(Continued)

(58) Field of Classification Search
CPC ....... B32B 37/02; B32B 17/064; B32B 37/10; B32B 37/223; B32B 38/004; B32B 41/00;
(Continued)

(56) References Cited

U.S. PATENT DOCUMENTS 7,691,220 B2   4/2010  Demers et al.
9,186,876 B1 * 11/2015  Queck .................... B32B 38/10
(Continued)

FOREIGN PATENT DOCUMENTS

EP    0 316 224    5/1989
EP    1 884 346    2/2008
(Continued)

*Primary Examiner* — George R Koch
(74) *Attorney, Agent, or Firm* — Clark & Brody LP

(57) ABSTRACT

The invention relates to an industrial machine for vertically applying temporary or permanent protective films on plane surfaces and having an automatic system for cutting the film, positioning it edge-to-edge or with a margin (in particular in the context of film-coating sheets of glass for the purposes of glazing any window frames without damaging the temporary protection; the glass being film-coated while leaving a setback) by acting simultaneously on both faces and adapting automatically to changes in the format of the parts for treatment, using an electrostatic method for holding the film in position on the applicator roller.

6 Claims, 4 Drawing Sheets

Figure 1:
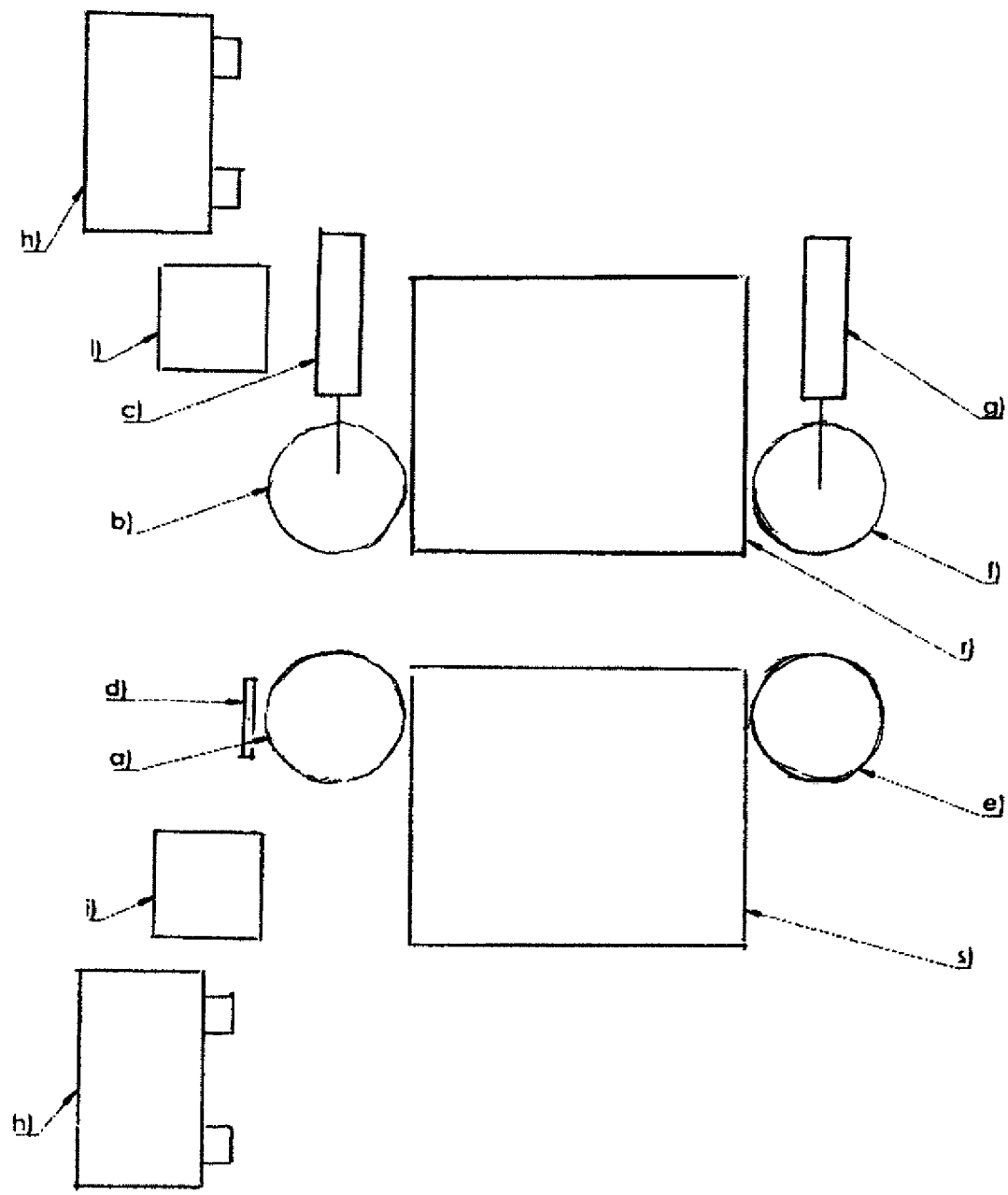

(51) Int. Cl.
  *B32B 37/10* (2006.01)
  *B32B 37/22* (2006.01)
  *B32B 38/00* (2006.01)
  *B32B 41/00* (2006.01)

(52) U.S. Cl.
  CPC .......... *B32B 38/0004* (2013.01); *B32B 41/00* (2013.01); *B32B 2250/03* (2013.01); *B32B 2250/40* (2013.01); *B32B 2307/584* (2013.01)

(58) Field of Classification Search
  CPC ............ B32B 2250/03; B32B 2250/40; B32B 2307/584
  See application file for complete search history.

(56) References Cited

U.S. PATENT DOCUMENTS

| | | | |
|---|---|---|---|
| 2003/0087592 | A1 | 5/2003 | Trpkovski |
| 2009/0301659 | A1* | 12/2009 | Nagura ............. B32B 17/10954 156/516 |
| 2016/0176171 | A1* | 6/2016 | Trpkovski ............. C03C 17/002 156/230 |

FOREIGN PATENT DOCUMENTS

| | | |
|---|---|---|
| EP | 3 034 275 | 6/2016 |
| FR | 2 852 553 | 9/2004 |

\* cited by examiner

INDUSTRIAL MACHINE FOR APPLYING TEMPORARY OR PERMANENT PROTECTIVE FILMS TO PLANAR SURFACES ACTING SIMULTANEOUSLY ON TWO FACES, HAVING A SYSTEM FOR CUTTING THE FILM AND POSITIONING EDGE-TO-EDGE OR WITH A MARGIN, AUTOMATICALLY ADAPTING TO SUIT CHANGES IN THE PARTS THAT ARE TO BE TREATED, USING AN ELECTROSTATIC METHOD

This application is a 371 of PCT/EP2017/000208, filing date Feb. 10, 2017.

The invention relates to an industrial machine for vertically applying temporary or permanent protective films on plane surfaces and having an automatic system for cutting the film, positioning it edge-to-edge or with a margin (in particular in the context of film-coating sheets of glass for the purposes of glazing any window frames without damaging the temporary protection; the glass being film-coated while leaving a setback) by acting simultaneously on both faces and adapting automatically to changes in the format of the parts for treatment, using an electrostatic method for holding the film in position on the applicator roller.

STATE OF THE ART

Needs:

Needs for temporary or permanent film coating on two faces arise in numerous industrial activities, in particular in the field of glazing for buildings.

Most manufacturers of glass for glazing buildings sell the glass without temporary protection, which protection may optionally be put into place a posteriori, either by the maker of the window who places the glass on the frame of the finished window ready for installation, or else by the building firm in charge of the window. Operations of protecting windows require a large amount of labor and represent a major cost as a result of that application being manual because it takes place on the frame. Furthermore, before assembling the framework and installing it on the building site, the glass is itself transported, stored, and handled on several occasions, giving rise to corresponding risks of scratching or damage. Consequently, the rejection rate due to glass suffering on worksites is considerable, in particular because of damage caused by the lack of temporary protection.

In order to limit the poor quality that results from such damage, manufacturers of glass (and in other sectors of activity that supply plane products) seek to put temporary films into place in the factory in a manner that is automatic and that does not degrade the productivity of the manufacturing line. That is why they are interested in finding a solution for film-coating both faces of the glass simultaneously, with a setback around the entire perimeter of the glass so that the temporary protective film can be installed in its frame without any need to remove a portion of the temporary protection. Specifically, the perimeter of the glass is received in the rabbet of the framework (or its equivalent) that holds the glass captive and that serves to hold it in the window. It is therefore important for the application of a temporary protective film to stop at the position of the perimeter of the glass once it is in place, without the protective film becoming wedged between the glass and the framework, which would prevent the film from being removed easily when finishing off the building.

The manufacturers of glass have another constraint, in that the glass products they manufacture are constantly of different dimensions, while manufacture takes place continuously regardless of the dimensions involved, such that pieces of glass leaving manufacture one after another may be of any dimensions (glass assembly lines are designed to fabricate large quantities of pieces of glass with different dimensions, and not to fabricate long series of pieces of glass all having the same size; and they generally produce a piece of glass in less than one minute). It is therefore important during the manufacturing cycle, for the automatic film-coating technology to act on its own to detect the size of the piece of glass and for it to place the protection on both faces without any human intervention.

Another constraint for manufacturers of glass lies in the fact that, for obvious savings in ground space, glass manufacturers manufacture, store, and handle their products in a generally vertical manner; as a result the film-coating method needs to be implemented in such a manner as to convey, coat, and release the substrates in vertical manner, generally sloping at 6°.

Concerning Existing Technologies:

In the state of the art, we are aware of four technologies that relate in part to the present invention (temporary film-coating in a more or less vertical position with peripheral setbacks), it being understood that none of them satisfies the principle of film-coating both faces simultaneously:

The first technology constitutes the subject matter of a patent number FR 2 852 553 for a method of vertically depositing films on substrates such as plates of glass, capable of starting film-coating at a distance from the edges of the glass, and characterized in that the film is made up of a plurality of widths (depending on the size of the window) that are laid in as many strips as needed, using suction technology for holding the film in position (claim 19) and using another device for cutting the film by means of a hot wire (claim 20). That technology suffers from several drawbacks in that the film is not held with great accuracy, thereby leading to large tolerances in the positioning of the film on the glass. In addition, it is necessary to have a finishing roller, because the technology of holding the film by means of suction does not make it possible to obtain a good application of the film over its portion in contact with the suction tool. Furthermore, the principle of hot cutting the film does not enable the film to be cut accurately because the burning of the film creates miniature waves in the film where cutting takes place. Finally, although the patent states that the technology could be used for single-face or for two-face application, it does not specify how to achieve that, to such an extent that no claim suggests a technology capable of covering two faces simultaneously.

A second patent, U.S. Pat. No. 7,691,220, was filed by the same inventor after the first patent (same FIG. 3) and it describes a technology for depositing the film with the film being held by a suction tool together with the principle of hot cutting, that technology being very different from the technology of the present application, which relies on an electrostatic principle, which presents better cutting accuracy, together with faster processing times since there is no need to use a finishing roller.

A third technology (that does not constitute the subject matter of intellectual property protection) is also based on principles comparable to depositing film while managing glass margins. It is performed by the (US)

company Cardinal using a method similar to depositing widths, the substrate being positioned more or less vertically as in the other technologies. In contrast, the major difference with the above technologies is that the film-coating module moves over the glass (whereas in the other inventions, it is the glass that moves under the film-coating module). Under no circumstances, does that machine make it possible to coat both faces, regardless of whether or not coating is instantaneous.

The fourth technology (and the technology that is closest to the present patent) was filed by the present inventor under application number 1601085. It relates to an industrial machine for applying temporary or permanent protective films horizontally and having an automatic system for cutting, for positioning, and for applying the film on the medium that is to be treated by using an "edge-to-edge" method without leading to waste film or flaps, and characterized by: A film-coating module having an applicator roller, an electrostatic charge bar, a cutter module for cutting the film, a backing roller, and actuators supporting the film-coating module; and other modules for compensator deflection, systems for conveying and positioning the substrate, and appropriate servo control. That machine, which incorporates electrostatic film holding technology, differs from the present invention in that the film coating takes place on one face in horizontal manner (it is for applications other than plane glass products). Nevertheless, its technological principles are close in that it uses the electrostatic method for holding and positioning the film, and it includes a film-coating module that is comparable in some details.

Consequently, the present invention is filed for the purposes of satisfying needs for vertical application of temporary or permanent protective films on plane surfaces, while having an automatic system acting simultaneously on both faces for cutting and for positioning edge-to-edge or with a margin, and that adapts automatically to changes in the format of the parts for treatment, using an electrostatic method for positioning and holding the film. The invention seeks to provide:

Simultaneous application on both faces with or without setback margins;
Cutting accuracy that is better than with technologies involving suction and hot cutting; and
Sufficient speed to enable it to be integrated in a manufacturing line without degrading its productivity.

SUMMARY OF THE INVENTION

Figure 2:
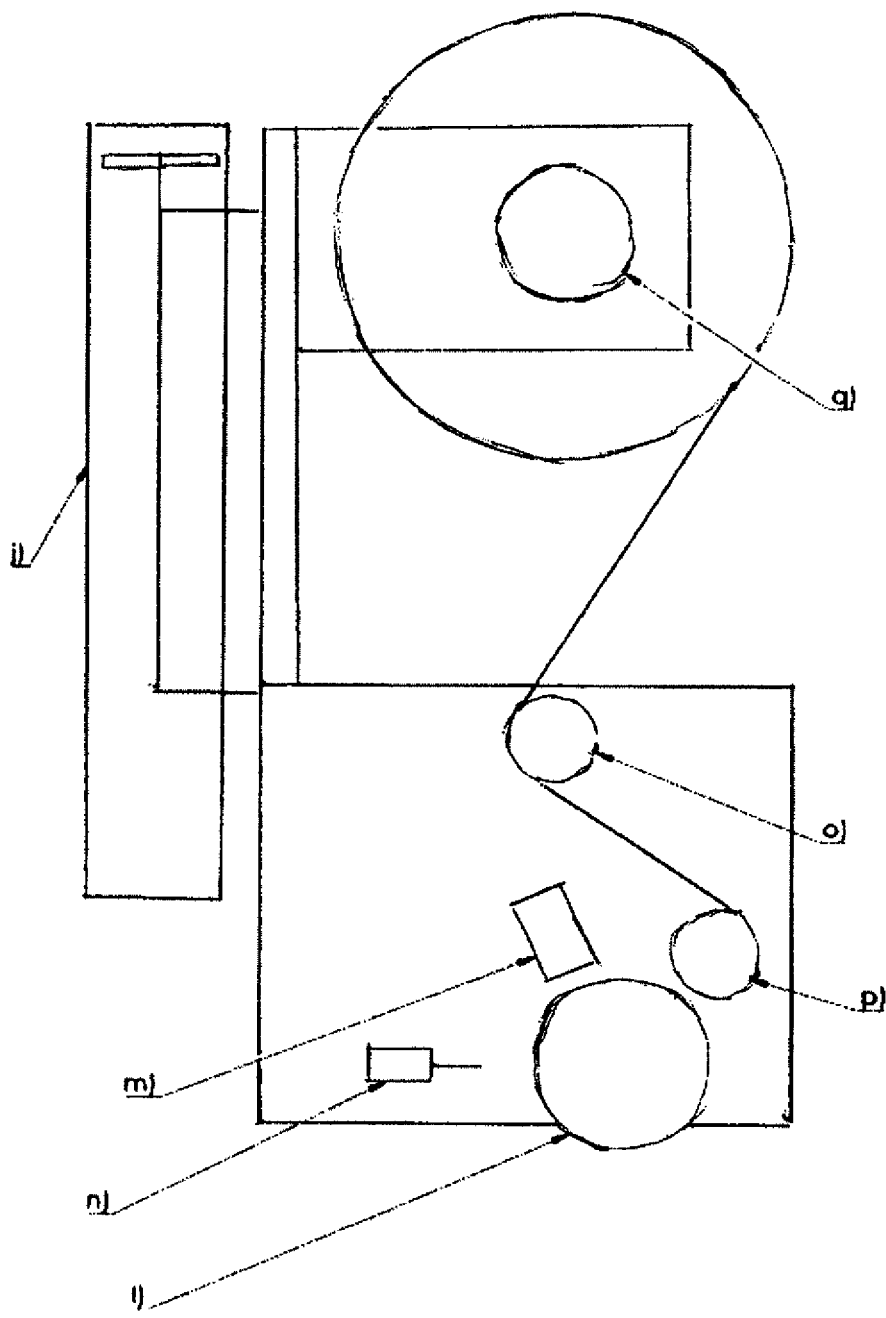
Figure 3:
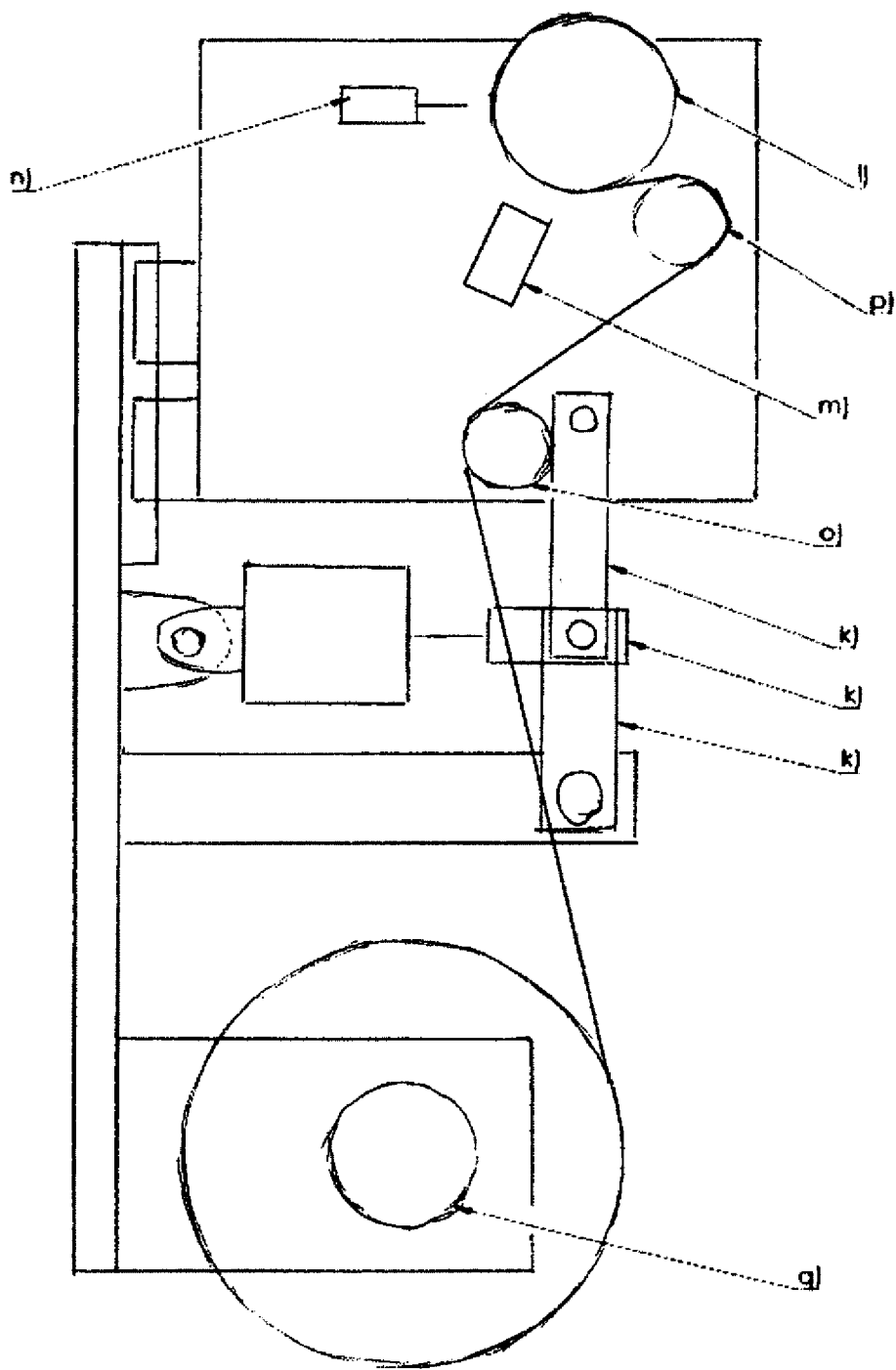
Figure 4:
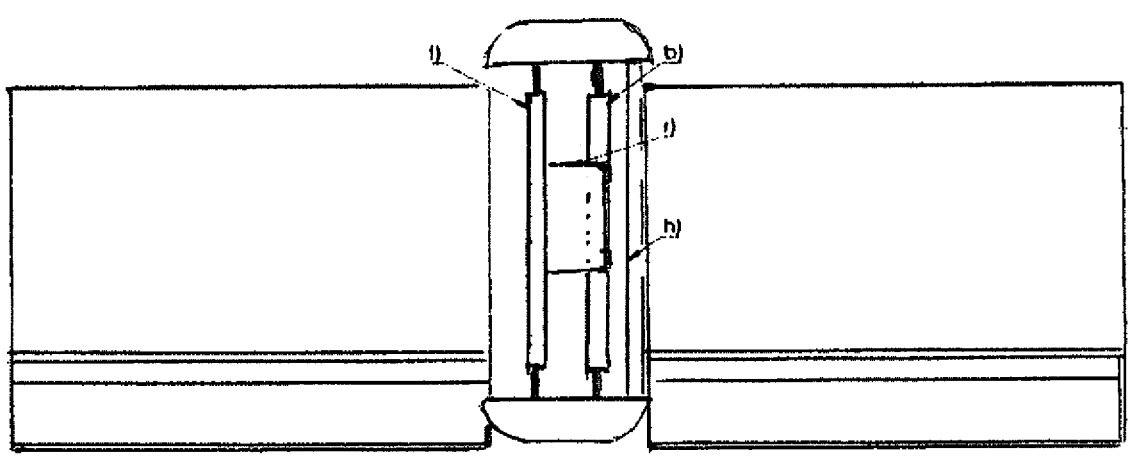

The invention relates to an industrial machine for vertically applying temporary or permanent protective films on plane surfaces and having an automatic system for cutting the film, positioning it edge-to-edge or with a margin (in particular in the context of film-coating sheets of glass for the purposes of glazing any window frames without damaging the temporary protection; the glass being film-coated while leaving a setback) acting simultaneously on both faces and adapting automatically to changes in the format of the parts for treatment, using an electrostatic charge method for positioning and holding the film in position on the applicator roller, the machine being characterized by:

An overall assembly (FIG. 1), also referred to as a "stand", made up of:
At least one motor-driven introducer roller (a) in a stationary position and at least one free introducer roller (b) that is horizontally movable, being actuated by actuators (c), and arranged symmetrically to the motor-driven roller(s) in order to convey and position the product for protection at the inlet.
A detector cell (d) after the introducer roller(s) (a and b) for determining the position of the substrate.
At least one motor-driven ejector roller in a stationary position (e) and at least one free and movable ejector roller (f) that moves horizontally and that is actuated by actuator(s) (g), being arranged symmetrically to the motor-driven roller(s) to convey and position the product for protection at the outlet.
Two vertical beams with linear guides (h) and two vertical mover assemblies (i) for vertically moving and positioning the film-coating modules (FIGS. 2 and 3).
Two film-coating modules designed in accordance with the technology of U.S. Pat. No. 1,601,085, i.e.:
A front face film-coating module (r) (FIG. 2) mounted on an actuator with a linear guide (j) to take up a position horizontally at the distance that is necessary as a function of the thickness of the substrate for protection and to exert appropriate film-coating pressure.
A rear face film-coating module (s) (FIG. 3) that is movable on a linkage system (k) having two positions: a retracted position (the module is not in contact with the substrate), and an extended position (it is positioned at the zero point), the applicator roller (l) being parallel and in line with the introducer and ejector rollers (a) and (e) in order to film-coat the substrate.
A controller having a program for controlling the various modules of the machine as a function of the dimensions of the media for treatment.

Each film-coating module (r and s) is made up of:
An applicator roller (l) that coats the film onto the medium.
An electrostatic charge bar (m) connected to a charge generator and positioned at a distance lying in the range 5 millimeters (mm) to 25 mm from the applicator roller (l), enabling the film to adhere to the applicator roller (l) while conserving its position accurately.
A cutter module (n) for cutting the film in contact with the applicator roller (l) at a distance from the bottom axis of the roller that is equivalent to the distance between the bottom axis of the applicator roller (l) and the rear edge of the substrate plus the margin (also referred to as the "setback") that is to be conserved in compliance with operator settings.
A deflector roller (o) serving to conserve an accurate angle between the roll of film and the applicator roller (l).
A silicone backing roller (b) that increases the contact area between the film and the applicator roller (l) in order to position the film under the charge bar and hold the film against the roller (l).
A spindle (q) carrying the roll of film and fitted with an unwinding brake system.

Compared with patent application number 1601085, the film-coating module (r and s) differs in that it incorporates the deflector roller (o) and the roll carrier spindle (q).

The machine operates as follows:
The operator places a piece of glass on the inlet conveyor and launches the cycle.
The piece of glass moves towards the machine, which has already been informed by other means (automatic detection, information from the manufacturing line or from the operator) enabling it to calculate the number of widths needed for completely covering the piece of glass.

The two film-coating modules (r and s) (FIGS. 2 and 3) take up positions at a certain height so that the bottom portion of the roll of film is at the height of the bottom edge of the piece of glass plus the height of the margin (that is to remain unprotected in order to be mounted in the framework).

The glass moves sideways, the introducer rollers (a and b) closing and positioning the piece of glass between the two film-coating modules (r and s) (FIGS. 2 and 3), with the edge of the glass at a distance from the axes of the applicator rollers (l) that is equivalent to the margin that is to be left free for future mounting in the framework (information specified on the control panel), the edge of the film being positioned on the axes of the applicator rollers (l).

The rear face film-coating module (s) (FIG. 3) advances to become positioned at the zero point in alignment with the introducer and ejector rollers (a, b and e, f), in contact with the product for protecting.

The front face film-coating module (r) (FIG. 2) closes, positioning the applicator roller (l) in contact with the glass for protecting.

The introducer rollers (a and b) move the glass sideways, the film being applied on both sides.

A cell (d) detects the rear edge of the glass, the ejector rollers (e and f) take over from the introducer rollers (a and b) and position the glass with its rear edge at a distance from the axis of the applicator roller (l) that is equivalent to the distance between the axis of the applicator roller and the cutting point plus the portion of the glass that is to remain without film coating.

The cutter module (n) goes into operation and cuts the film.

The ejector rollers (e and f) position the glass with its rear edge at a distance from the axis of the applicator roller (l) that is equivalent to the margin that is to remain without film coating.

The film-coating modules (r and s) (FIGS. 2 and 3) open, the glass reverses, and the same modules take up positions at the appropriate height for applying the following strip.

The cycle begins again.

FIGURES

1/4 view of the structure without the film-coater
2/4 front view of the film-coating module
3/4 rear view of the film-coating module
4/4 assembled machine with introducer and ejector conveyors

GLOSSARY a) motor-driven introducer roller
b) free introducer roller
c) actuator for introducer roller
d) detector cell
e) stationary position motor-driven ejector roller
f) free and movable ejector roller
g) actuator for ejector roller
h) vertical beams with linear guides
i) vertical mover assemblies
j) linear guide for front film-coating module
k) linkage system for rear film-coating module
l) applicator roller
m) electrostatic charge bar
n) cutter module
o) deflector roller
p) silicone backing roller
q) film roll carrier
r) front film-coating module
s) rear film-coating module

The invention claimed is:

1. An industrial machine for applying temporary or permanent protective films on plane surfaces of a product to be protected, the plane surfaces being perpendicular to a horizontal plane, the industrial machine having an automatic system for cutting the film, positioning the film edge-to-edge or with a margin on the product and acting simultaneously on both front and rear faces of the product and adapting automatically to changes in a format of the product for treatment, using an electrostatic charge method for positioning and holding the film in position on rollers, the industrial machine further comprising:
  an assembly provided with a system for conveying and positioning the product;
  two film-coating modules placed on linear guides for moving the two film-coating modules vertically and horizontally, one of the film-coating modules being a front face film-coating module for coating the front face of the product, the other of the two film-coating modules being a rear face film-coating module for coating the rear face of the product;
  wherein each of the two film-coating modules comprises:
  a) an applicator roller that coats the film onto the product;
  b) an electrostatic charge bar (m) connected to a charge generator and positioned at a distance from the applicator roller (l), enabling the film to adhere to the applicator roller (l) while conserving a position thereof accurately; and
  c) a cutter module (n) for cutting the film in contact with the applicator roller (l) when the product is positioned with a rear edge thereof at a distance vertically from an axis of the applicator roller (l) on a substrate side of the product that is equivalent to a distance between a bottom axis of the applicator roller (l) and a cutting point plus a portion of the product that is to remain without film coating; and
  a controller having a program for controlling the two film-coating modules as a function of dimensions of the product.

2. The industrial machine according to claim 1, wherein the assembly further comprises:
  at least one motor-driven introducer roller (a) in a stationary position and at least one free introducer roller (b) that is horizontally movable, being actuated by first actuator (c), the at least one free introducer roller (b) being arranged symmetrically to the at least one motor-driven roller in order to convey and position the product at an inlet of the two film-coating modules;
  a detector cell (d) after the at least one introducer and free introducer rollers (a and b) for determining a position of the product;
  at least one motor-driven ejector roller in a stationary position (e) and at least one free and movable ejector roller (f) that moves horizontally and that is actuated by second actuator (g), being arranged symmetrically to the at least one motor-driven introducer roller and the at least one free introducer roller to convey and position the product at an outlet of the two film-coating modules; and two vertical beams with linear guides (h) and two vertical mover assemblies (i) for vertically moving and positioning the two film-coating modules.

3. The industrial machine according to claim 2, wherein the rear face film-coating module is movable on a linkage system (k) having two positions: a retracted position when the rear face film-coating module is not in contact with the product, and an extended position when the rear face film-coating module is positioned at a zero point, the applicator roller (l) being parallel and in line with the at least one motor-driven introducer roller (a) and the at least one motor-driven ejector roller (e) in order to film-coat the product.

4. The industrial machine according to claim 1, wherein
each electrostatic charge bar (m) is positioned at a distance lying in a range of 5 mm to 25 mm from each respective applicator roller (l); and
wherein each of the two film-coating modules further comprises;
a deflector roller (o) serving to conserve an accurate angle between a roll of film and each applicator roller (l);
a silicone backing roller (p) that increases contact area between the film and each applicator roller (l) in order to position the film under the electrostatic charge bar and hold the film against the applicator roller (l); and
a spindle (q) carrying the roll of film and fitted with an unwinding brake system.

5. The industrial machine according to claim 4, wherein the front face film-coating module (r) is mounted on an actuator with a linear guide (j) to take up a position horizontally at a distance that is necessary as a function of a thickness of the product and to exert appropriate film-coating pressure.

6. A method of applying temporary or permanent protective films using the industrial machine according to claim 1, characterized in that the automatic control of the two film-coating modules and components of the industrial machine operate in the following order:
an operator places a piece of glass as the product to be protected and launches a cycle;
the glass moves towards the industrial machine, the industrial machine having calculated a number of widths needed for completely covering the glass;
the two film-coating modules (r and s) take up positions at a certain height so that a bottom portion of a roll of film is at a height of a bottom edge of the glass plus a height of a margin;
the glass moves sideways, introducer rollers (a and b) closing and positioning the glass between the two film-coating modules (r and s), with an edge of the glass at a vertical distance from axes of the applicator rollers (l) beside the product that is equivalent to the margin that is to be left free for future mounting in a framework, an edge of the film being positioned on the axes of the applicator rollers (l);
the rear face film-coating module (s) advances to become positioned at a zero point in alignment with the introducer rollers (a and b) and ejector rollers (e and f), in contact with the glass;
the front face film-coating module (r) closes, positioning the applicator roller (l) thereof in contact with the glass;
the introducer rollers (a and b) move the glass sideways, the film being applied on both front and rear faces of the glass;
a cell (d) detects a rear edge of the glass and the ejector rollers (e and f) take over from the introducer rollers (a and b) and position the glass with the rear edge thereof a distance from the axis of the applicator roller (l) that is equivalent to a distance between an axis of the applicator roller and a cutting point plus a portion of the glass as a margin that is to remain without film coating;
the cutter module (n) cuts the film;
the ejector rollers (e and f) position the glass with the rear edge the at a distance from the axis of the applicator roller (l) that is equivalent to the margin that is to remain without film coating;
the two film-coating modules (r and s) open, the glass reverses, and the two film-coating modules take up positions at an appropriate height for a next cycle; and
the next cycle begins.

* * * * *